June 22, 1954 R. E. WILLIAMS 2,681,584
ELECTRONIC TONE GENERATOR
Filed Aug. 17, 1948 9 Sheets-Sheet 1

INVENTOR
Richard E. Williams
BY
Bean, Brooks, Buckley & Bean
ATTORNEYS

June 22, 1954 R. E. WILLIAMS 2,681,584
ELECTRONIC TONE GENERATOR
Filed Aug. 17, 1948 9 Sheets-Sheet 2

INVENTOR
Richard E. Williams
BY
Bean, Brooks, Buckley & Bean
ATTORNEYS

June 22, 1954  R. E. WILLIAMS  2,681,584
ELECTRONIC TONE GENERATOR
Filed Aug. 17, 1948  9 Sheets-Sheet 3

INVENTOR
Richard E. Williams
BY
Bean, Brooke, Buckley & Bean.
ATTORNEYS

June 22, 1954  R. E. WILLIAMS  2,681,584
ELECTRONIC TONE GENERATOR
Filed Aug. 17, 1948   9 Sheets-Sheet 4

INVENTOR
Richard E. Williams
BY
Bean, Brooks, Buckley & Bean
ATTORNEYS

June 22, 1954 R. E. WILLIAMS 2,681,584
ELECTRONIC TONE GENERATOR
Filed Aug. 17, 1948 9 Sheets-Sheet 5

INVENTOR
Richard E. Williams
BY
Bean, Brooks, Buckley & Bean.
ATTORNEYS

June 22, 1954  R. E. WILLIAMS  2,681,584
ELECTRONIC TONE GENERATOR
Filed Aug. 17, 1948  9 Sheets-Sheet 6
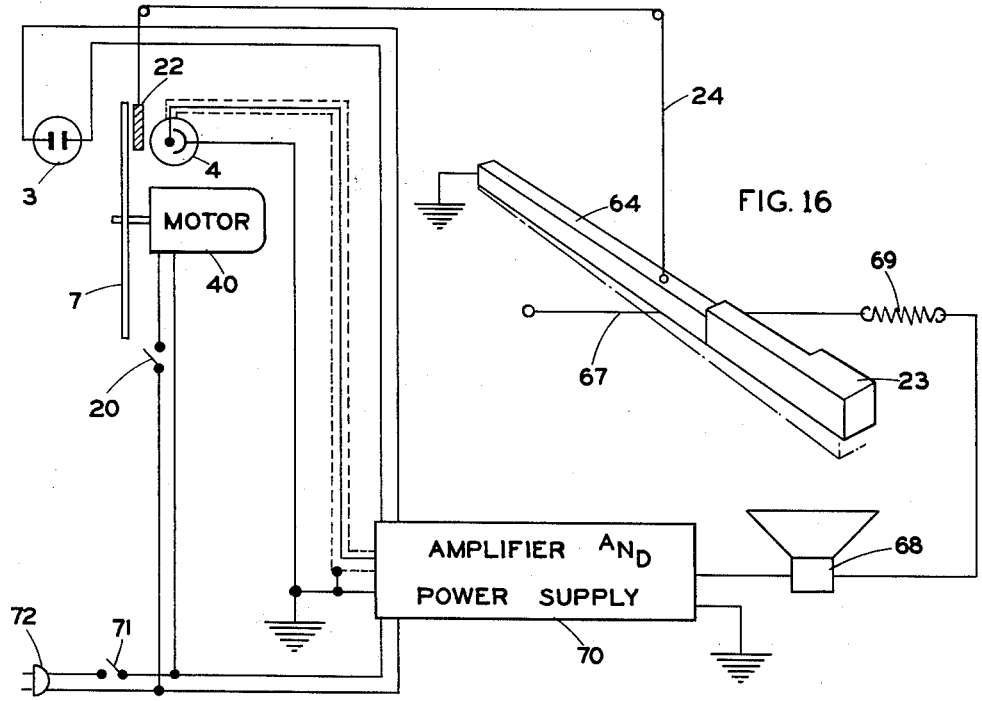
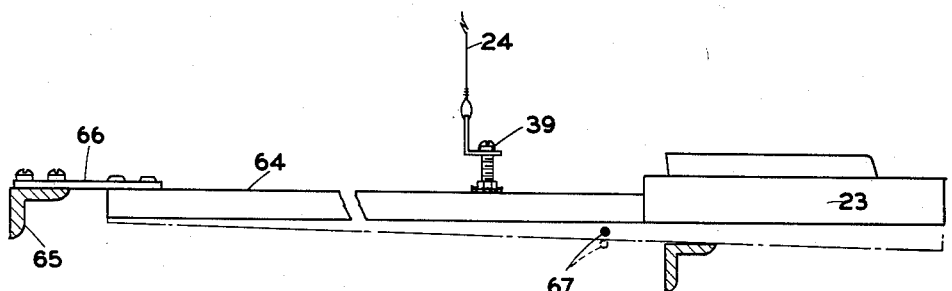
FIG. 15
INVENTOR
Richard E. Williams
BY
Bean, Brooks, Buckley & Bean.
ATTORNEYS

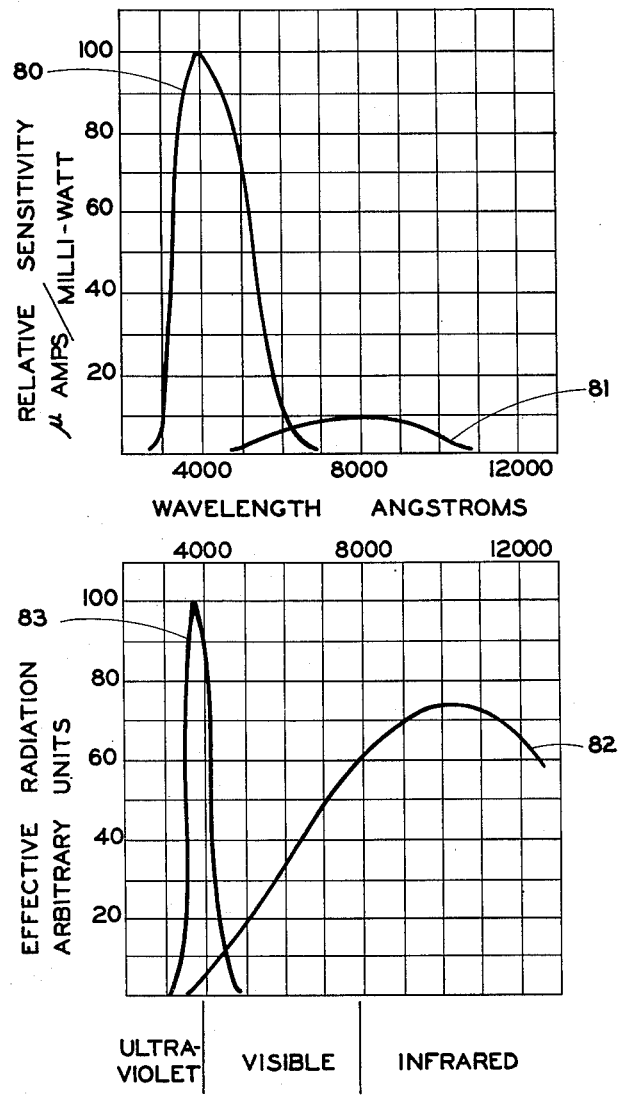

June 22, 1954 R. E. WILLIAMS 2,681,584
ELECTRONIC TONE GENERATOR
Filed Aug. 17, 1948 9 Sheets-Sheet 8

INVENTOR
Richard E. Williams
BY
Bean, Brooks, Buckley & Bean.
ATTORNEYS

Patented June 22, 1954

2,681,584

UNITED STATES PATENT OFFICE 2,681,584

ELECTRONIC TONE GENERATOR

Richard E. Williams, Manchester, N. H., assignor to Wilbespan Research Labs, Inc., Manchester, N. H.

Application August 17, 1948, Serial No. 44,697

13 Claims. (Cl. 84—1.18)

This invention relates to an electronic tone generator and more particularly to a musical instrument by which musical tones either singly or in combinations may be produced through a source of light passing through a light screen and acting with a light modifying function upon the light cell.

It has heretofore been proposed to utilize the light sensitive cell in an audio frequency circuit by employing a lens interposed between the source of light and the photoelectric cell, but difficulty has been experienced in a clear line of demarcation between the adjacent sound tracks. Furthermore, the earlier disclosures have certain limitations which tend toward an impractical or costly instrument.

An object of the present invention is to provide a tone generator of the electronic type wherein the tone color of the instrument may be readily and expeditiously changed and thereby render the instrument suitable for use in public performances. Further, the invention has for its object to provide a musical instrument of the keyboard or console type which is efficient in operation, simple and compact in construction, and one that will readily adapt itself for economical manufacture and easy installation.

Again, the invention has for its object to provide a musical instrument of this character in which the tone is clear and further one in which various tone effects and qualities may be produced in a unique manner that facilitates the manual playing of the instrument.

Furthermore, the invention will be found to reside in an improved musical instrument by which the need of lenses is dispensed with and greater efficiency is secured.

A further aim of the invention is to provide a supersonic excitation in a gaseous source of light which increases efficiency and provides easier starting and operation.

The foregoing and other objects will manifest themselves as the following description progresses, reference being had to the accompanying drawings wherein:

Fig. 15 is a detailed view showing the mounting of one of the keys of the keyboard;

Fig. 16 illustrates the key controlled circuit for the musical instrument or tone generator;

Figs. 18 and 19 are graphs depicting the relationship of the maximum wave length of the source of light and the maximum sensitivity of the light sensitive cell;

Figure 3:
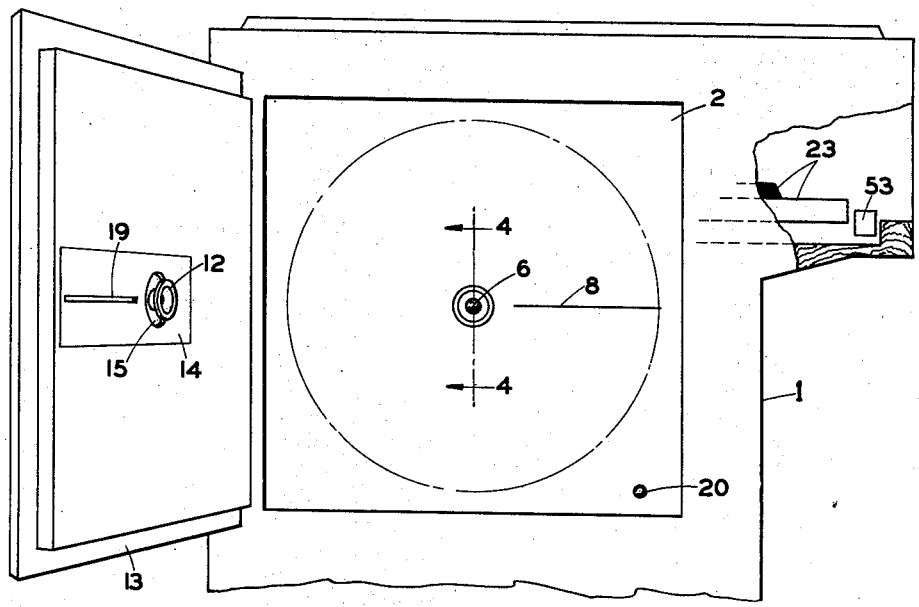
Fig. 3 is a fragmentary side elevation of the musical instrument with the parts arranged for placement of the sound disk, a portion of the cabinet being broken away to show the keyboard association.
Figure 4:
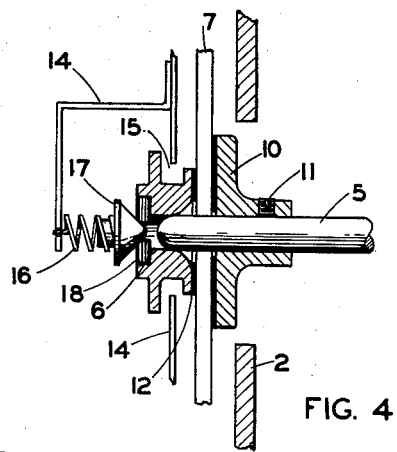
Fig. 4 is a view about on line 4—4, but with the cabinet door in its closed position.
Figures 5, 6:
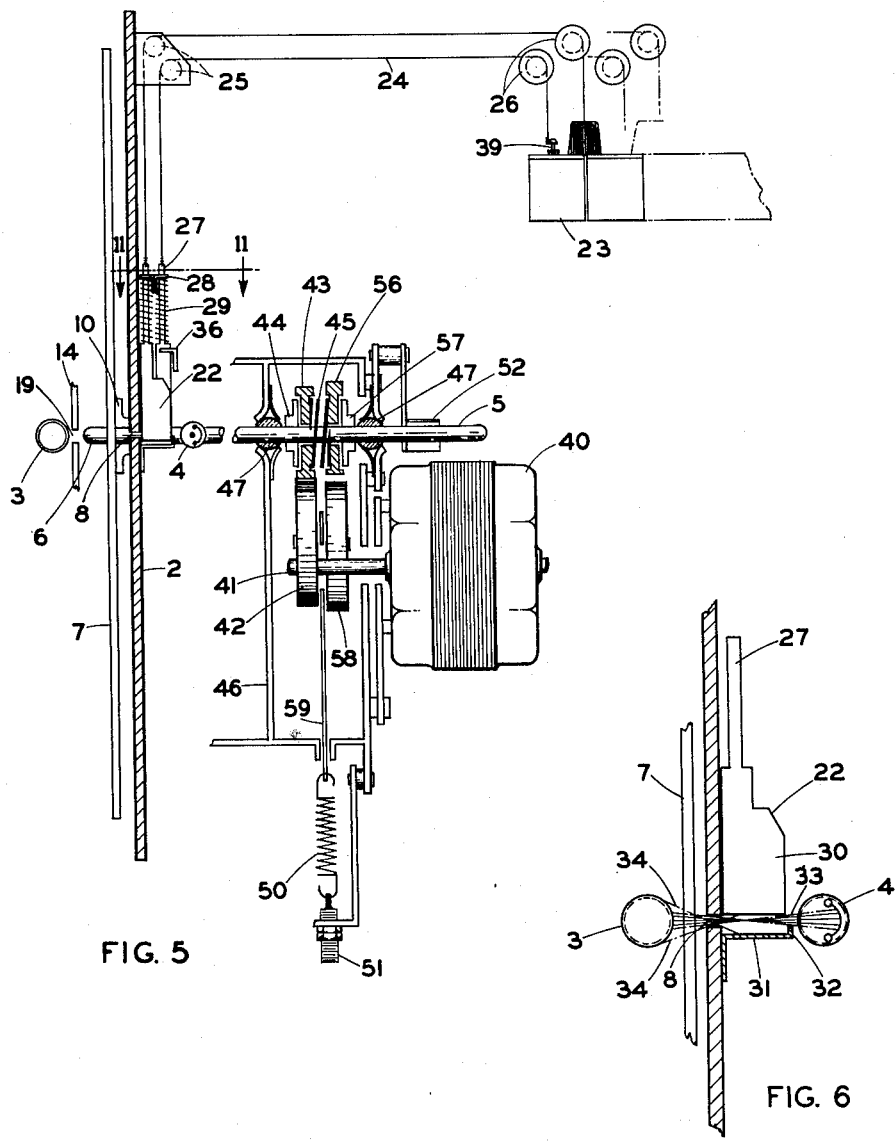
Fig. 5 is a view similar to Fig. 4, but showing the power mechanism within the cabinet.

Referring more particularly to Figs. 3, 4 and 5, the illustrated embodiment of the tone generator is housed within a cabinet 1 which has a record playing chamber with the bottom wall 2 thereof serving as a light screen between the light source 3 and the light sensitive cell 4. A power driven shaft 5 projects through the screen into the chamber to provide a spindle 6 for supporting a disk record 7 adjacent a light slit 8 in the light screen whereby the transparent sound tracks 9 of the playing record will serve to modulate the light beam in its action upon the cell 4.

A record playing table 10 within the chamber is fixed to the shaft, as by a set screw 11. The spindle is journaled horizontally within the playing chamber and cooperates with a relatively movable pad 12 to secure the record in position. The cabinet is preferably provided with a door 13 hinged or otherwise secured thereto and which by opening gives access to the playing chamber and its disk carrying spindle. The door may mount the disk holding pad 12 and thereby facilitate the placement and replacement of the sound record. The pad 12 is given a limited freedom of movement in its mounting in a casing 14 so that it will center itself upon the spindle when the door is closed. As shown, the pad is arranged within an opening 15 in the casing wall and is cushioned by a backing spring 16 having a head 17 yieldably resting in a seat 18 on the pad in opposition to the spindle. The holder is therefore afforded a floating support. The casing provides a compartment for containing the light source 3, and the wall of the casing is provided with a light emitting slot 19 in registry with the relatively smaller light slit 8. When the cabinet door 13 is moved from a closed position, the sound record will be released, and at the same time the driving motor will stop by reason of a door actuated switch 20 that is permitted to open. This switch may be of any desired form and is placed to be engaged by the door and closed when the latter is moved to its disk holding position.

The sound track record may be of any desired and suitable type although herein it is shown in the form of a transparent disk to one side of which is applied a plurality of concentrically arranged sound tracks varying periodically in transparency. The rotating spindle will cause the disk to rotate at such a speed that the light beam passing through one or more of the sound tracks will be modulated at a certain fundamental frequency with desired overtones and will be impressed accordingly upon the photoelectric cell 4 for conversion of the light variations into corresponding electrical impulses which, in turn, are amplified in a conventional manner through a loud speaker arrangement. The disk may be imprinted with as many concentric sound tracks as desired, such as one for each tone in a chromatic musical scale, or one for each key of the particular keyboard employed. The sound characteristics of the tracks on each disk may be similar, that is they may all partake of the organ tone, or of the cornet, or clarinet, or violin, or the like, with the result that the generated tones would have a like identifying musical sound. If desired, each track could consist of a plurality of instrument recordings in unison, octava, or in definite intervals in unlimited combinations. Also keyboard octaves could be assigned varied instruments or combinations thereof.

Figure 17:
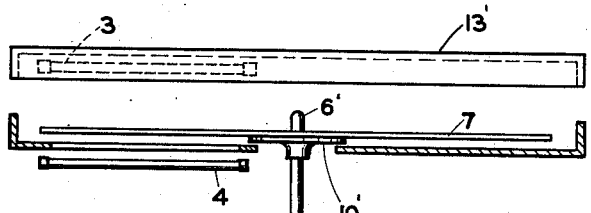
Fig. 17 is a view showing a modification in which the record supporting spindle and its record playing table are mounted for rotation about a substantially vertical axis.

If desired, the disk supporting spindle 6', with its table 10' fixed thereto, may be arranged to rotate about a vertical axis, as shown in Fig. 17. In this arrangement the disk will be held on the playing table by gravity, or the cooperating holding pad 12 may be provided for the purpose. The placement and replacement of the record is readily and expeditiously accomplished by the musician by simply lifting the cover or lid 13', removing the record, and substituting another. This imparts a tone color flexibility to the instrument and enables the musician to rapidly convert the tone color of his instrument during a public performance without distraction from the program.

The light beam from the source of light 3 is controlled in its impression upon the light sensitive cell by means of shutters 22, one for each note track 9. These shutters constitute valves which normally block the passage of the light beam to the cell and are selectively displaceable from the path of light by suitable means, such as the keys 23 of a piano or organ keyboard to which the shutters or valves are connected in a suitable manner. Herein the connection between each key and its shutter is mechanical, being in the form of a flexible wire or cable 24 which takes over suitable guide pulleys 25 and 26 and has its opposite ends connected, respectively to the key and its corresponding shutter. Each shutter has a mounting shank 27, slidable in an upper guide 28 against the action of a valve closing spring 29, and a relatively wider or deeper body 30 having an effective thickness sufficient for blocking the passage of the light beam when the shutter is closed upon the ledge or seat 31. The upturned margin 32 of the ledge lies approximately in the plane of the lower wall of the light aperture or slit 8 thereby giving an effective length to the bottom wall of the slit throughout the depth of the shutter seat. Likewise, the shutter when opened has its effective lower edge portion normally lying substantially in the plane of the upper edge of the light slit with the result that a clearly defined light beam passes through the effective light slit for action upon the cell, as shown by the beam lines 33 in Fig. 6 wherein the lateral and more divergent light rays 34 are obstructed by the walls of the valve opening.

Figure 7:
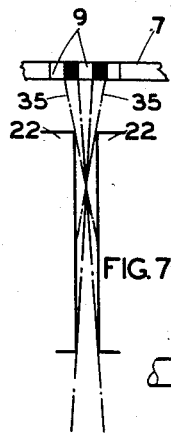
Figs. 6, 7 and 8 are detailed views diagrammatically depicting the valving of the light beam.
Figure 8:
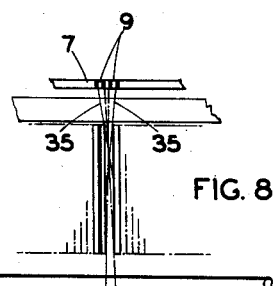

Similarly, the light beam from adjacent sound tracks are blocked against passage through a selected path because of the depth of the adjacent valves 22. Figs. 7 and 8 illustrate the adjacent unselected note beams 35 being blocked by the adjacent valves which constitute the defining walls of the selected valve opening. By means of this simple arrangement the selected light beam is kept clear and definite in its impression upon the cell without any tone obscuring effect as might be otherwise superimposed on the cell by the uncontrolled passage of extraneous light beams from adjacent sound tracks. Therefore, the tonal quality will be preserved and the sound will be clear and distinct, this being accomplished mechanically and without the use of lenses or other special equipment.

Figure 9:
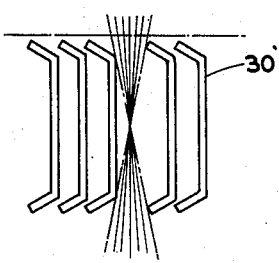
Fig. 9 depicts a modified embodiment of a light valve.
Figure 10:
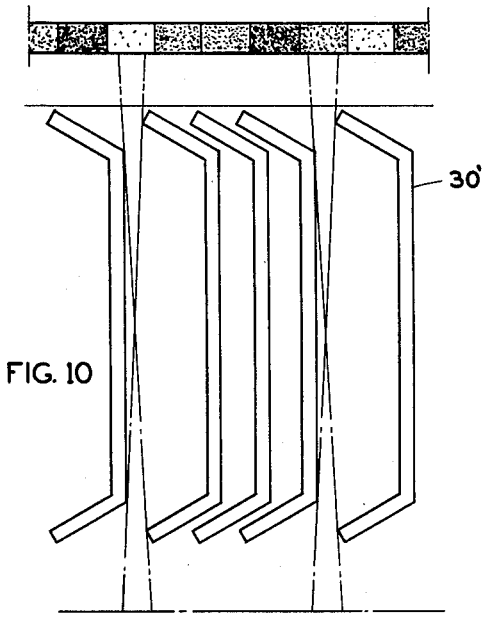
Fig. 10 is a diagrammatic view illustrating more clearly the action of the modified light valve.

The cross sectional shape of the light valves may vary. In Figs. 7 and 8 the light valve body is rectangular in cross section, while in Figs. 9 and 10 the valve body 30' is of channel form to permit a partial nested relationship with the adjacent valves. Such relationship affords an overlap along the opposite margins of the valves which enables a closer sound track assemblage with a material saving in the width of the partition between adjacent tracks. Consequently, the track area that is scanned is maximum and without the light beam overlapping the opposite side light-obscuring margins of the track. The greater the scanned area the larger will be the sound volume.

Figure 1:
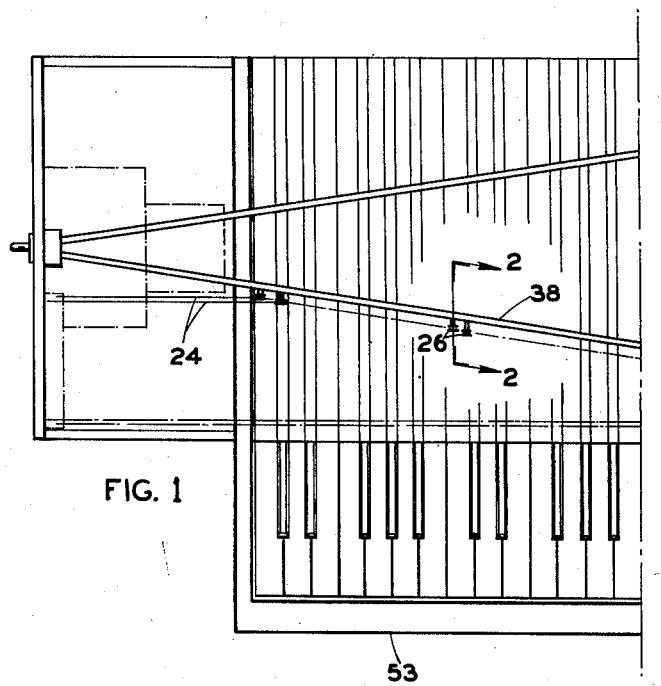
Fig. 1 is a fragmentary diagrammatic view of the keyboard and certain associated parts.
Figure 2:
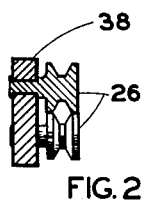
Fig. 2 is a detailed sectional view about on line 2—2 of Fig. 1.
Figure 11:
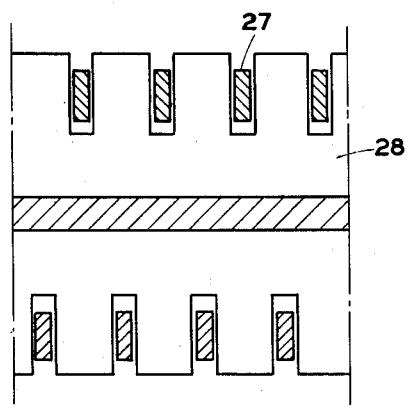
Fig. 11 is a detailed sectional view through the valve guides as viewed about on line 11—11 of Fig. 5.

As a further means of providing a compact assemblage of the light valves and at the same time affording proper guidance of the valves in their movements, each shank 27 is off centered or arranged closer to one edge of the valve body and the alternate valves are reversed to stagger the shanks with the result that the guide slots in the upper guide 28 will be staggered, as illustrated in Fig. 11. This will afford increased structural strength in the guide bar and also a more compact association in the bank of valves. Lower guides 36 serve to steady the valves in their vertical movements. This inverse order of the valves not only enables a closer arrangement of the valves but also a closer grouping of the flexible cables 24, and in order to properly support the closely grouped wires their pulleys 25 may be in the form of rollers having peripheral pulley grooves in close proximity with each other but staggered relative to the pulley grooves of the companion roller, as seen at 37 in Fig. 13. Again, and with the thought of conserving space, the pulleys 26 are likewise arranged in staggered order as well as in laterally offset relation, as depicted in Figs. 1 and 5. The lateral offsetting is accomplished by positioning the pulley supporting frame member 38 on a bias with respect to the wires. Consequently, as the wires pass from the keys upwardly over the staggered and laterally offset pulleys 26, they will be in proper parallelism for taking over the grooved rollers or multiple pulleys 25 and from thence down to the corresponding light valves. The tension of the cables or wires 24 may be regulated by adjusting the screws 39 on the keys. It is to be understood that the staggering mentioned may be in periodic groups or any desired number per group.

Figure 13:
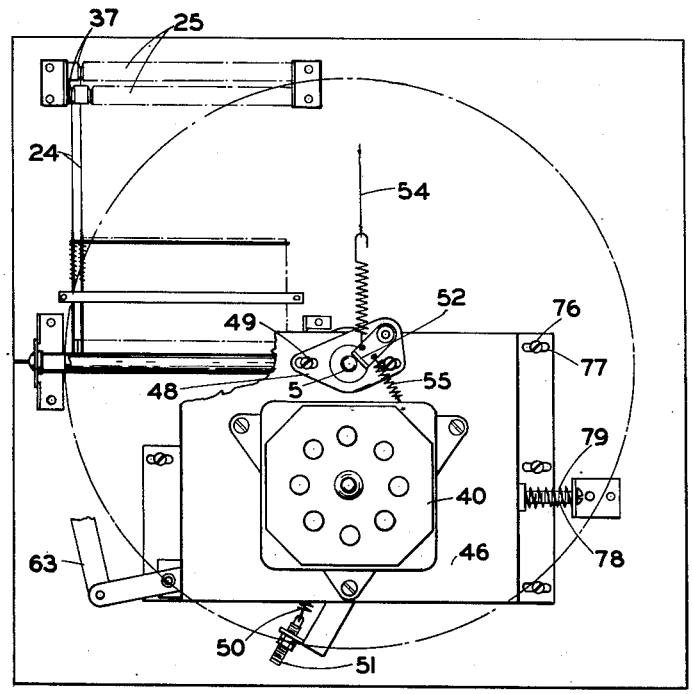
Figs. 13 and 14 are further views of the power driven mechanism.
Figure 14:
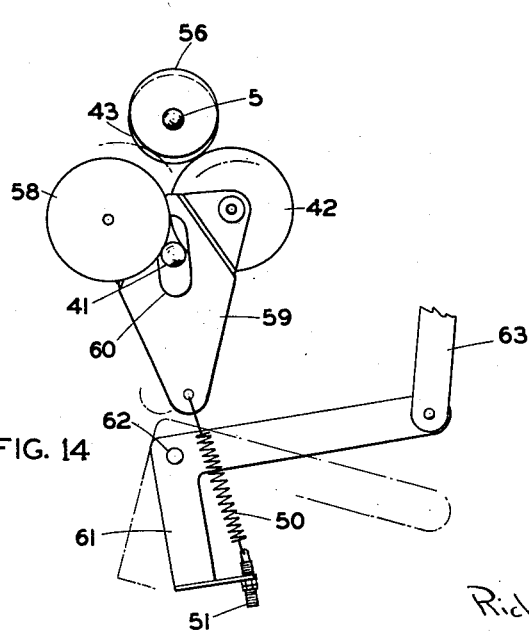

Referring to Figs. 5, 13 and 14, the power driven shaft 5 is driven from a light electric motor 40 which has its shaft 41 acting initially on a transmission wheel 42 which in turn is in peripheral driving contact with a wheel or friction gear 43 on the driven shaft. This friction gear may be fixed upon the driven shaft, or it may be free to rotate thereon and frictionally clutched thereto by a shaft-fixed clutch disk 44 against which it is pressed by a spring 45.

The spindle shaft 5 is suitably journaled within a motor carrying frame 46, as by the spherical bearing 47. One spherical bearing may be carried in an adjustable plate 48 secured to the frame 46 by screws 49 for lateral adjustment to provide an adjustment which may insure perfect normalcy of the spindle shaft to the light shield or screen 2.

The instrument may be tuned by retarding the motor speed, such as with a governor or by imposing a load on the motor shaft 41. This is accomplished herein by employing a spring 50, the tension of which is regulated by a screw 51, to urge the transmission gear 42 more firmly against the shaft. The small motor 40, a low fractional horsepower size—approximately one one-hundredth horsepower—is satisfactory, will react to this spring imposed load and cause a lower rotative speed of the sound disk. A reduction in the effective speed of the sound disk will allow fewer cycles of transparent variations in the sound track to pass each aperture, as provided by an open shutter, in a given time interval and thereby cause a corresponding reduction in audio frequencies. This manifests itself in a simultaneous lowering in pitch of all the sound track tones. Once set, the speed, and therefore the pitch, remains essentially constant.

A glissando effect may be performed by momentarily braking the spindle shaft 5 by means of a brake 52 which is connected to a bar 53, in Figs. 1 and 3, adjacent the keyboard by a flexible member 54, the glissando bar extending across the front ends of the keys for contact by the hand. This glissando control is such that the braking torque can preferably be varied by the operator at any time by pressing the glissando bar 53 with the heel of the hand. A spring 55 retracts the brake when the bar 53 is released.

For securing a vibrato effect a frequency vibrato brake may be provided for producing sinusoidal variations in the braking torque applied to the spindle shaft although this effect is accomplished herein by alternate fluctuations in the rotative speed of the shaft as shown in Figs. 5 and 14. For this purpose a friction wheel or gear 56 is rotatively mounted eccentrically on the spindle shaft adjacent a second clutch disk 57 fixed thereon and so arranged as to have the spring 45 react against the eccentric vibrato wheel 56 to urge it into clutched relationship with the disk 57. A power transmitting gear 58 serves to connect the motor shaft 41 to the vibrato wheel. The two transmission gears 42 and 58 are selectively engaged with one or the other of their respective wheels 43, 56, but are preferably in constant driving engagement with the motor shaft 41 at the upper side thereof. For this selective operation or placement the transmission gears are journaled on a rockable frame 59 which is loosely guided on the motor shaft by reason of the shaft-receiving slot 60. The spring 50 acts to urge the gears 42, 58 against the shaft. An actuating arm 61 is pivoted at 62 and carries the spring anchoring screw 51, the arrangement being such that the arm can shift the line of spring force across a dead center position relative to the pivot 62. This action will quickly disengage one gear and engage the companion gear with the spindle carried gears. The actuator 61 is rendered accessible to the keyboard through a suitable connection 63. The quick change-over is accomplished expeditiously and without removing the spindle shaft from its source of power for any appreciable time interval.

The playing speed of the spindle shaft is such as to produce a desired vibrato effect, preferably about seven cycles per second which is the most pleasing. At this speed any irregularity in the concentric mounting of the normal driving gear 43 will rather produce a pleasing vibrato rather than an unpleasant reaction.

A further unique feature is the fact that the loud speaker is connected into the system by and during depression of any of the keys, thereby lowering the noise between the notes played and reducing microphonism. As a means of accomplishing this, each key is provided with a metal bar or electrical conductor 64 and may be suitably grounded as through the frame member 65 to which it is connected by a flat spring 66, Fig. 15. Underlying the series of keys 23 is a conductor wire or member 67 which is adapted to be engaged upon the depression of a key so as to close the electric circuit through the conductor 64 and the loud speaker 68, the conductor being rendered yieldable by a spring 69. Although switching of the loud speaker is shown, any switching which would render the amplifying or reproducing system essentially inoperative may be employed.

The circuit lay-out for the tone generator is diagrammatically illustrated in Fig. 16 wherein the audio frequency amplification is shown at 70 and a disconnect switch for the instrument is shown at 71 for connecting and disconnecting the instrument to and from the source of electrical energy or power line to which electrical connection may be established by means of the plug 72.

In operation, the switch 71 is initially closed so as to energize the system including the light source 3 and the light sensitive cell 4. The record having the concentric sound or note tracks therein is placed upon the spindle 6 following which the door 13 is shut and the switch 20 is concurrently closed to energize the motor 40. Thereafter, the depression of any one of the keys 23, or any combination thereof, will open the selected light valves for passing the track modified light beams to the light sensitive cell whereupon the latter will act through the amplifier and impressed across the loud speaker for the production of sound, the loud speaker being connected in through the keys contacting the contact wire 67.

Figure 12:
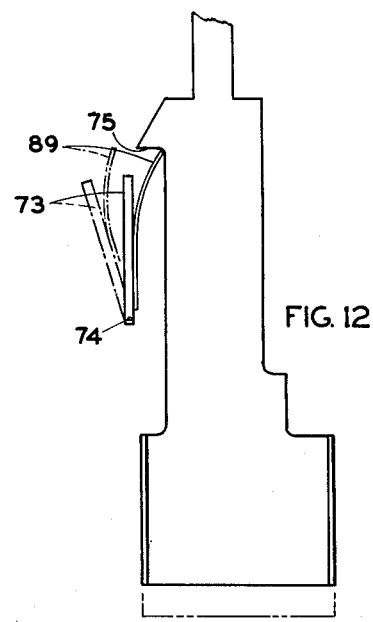
Fig. 12 is a diagrammatic illustration of the "hold open" stop modification.

For prolonged notes, the shutters or light valves may be maintained open after release of the respective keys. This may be readily accomplished by providing a lock bar 73, Fig. 12, movably supported at 74 and mechanically connected by a flexible wire (not shown) to a pedal for foot actuation. The lock bar 73 will have a series of spring tongs 89, one for each shutter, and each yieldable independently of the other for yielding out of the path of its individual shutter should the latter be opened during intervals when the "hold open" pedal is being held depressed. By depressing the pedal, the lock bar is moved from the broken-line position to the full-line position where it engages beneath a shoulder 75 whenever a shutter is elevated to an open position. Release of the pedal will permit the lock bar to release the valve and return to its normal position.

The overlapping relationship of the several light valves enables a spacing of the sound tracks with little or no non-margins therebetween. This permits the shutters to be arranged closer to one another than the width of the sound tracks so that the actual scanning of the light beam is less than the width of the track. This, therefore, makes it possible for either the valves or the tracks to be shifted laterally with respect to each other. For this purpose, and by way of example, the tracks are herein adjusted by giving the motor supporting frame 46 adjustable support by the screws 76, Fig. 13, engaging in the slot 77. Turning an adjusting screw 78 will shift the frame 46 and its carried spindle shaft 5 to thereby bring the sound tracks into the desired registering relation to their valve openings, a compression spring 79 cooperating with the screw 78 to effect the desired adjustment.

The source of light 3 is preferably of the glow discharge or gas type. It may have a fluorescent excitation. The term gaseous bulb is, therefore, used in a comprehensive sense to also include a fluorescent bulb. The use of a gaseous light source enables the maximum wave length of light to be concentrated on the cell at its maximum sensitivity. This is illustrated graphically in Figs. 18 and 19. In Fig. 18 the left hand curve 80 is that of a so-called S-4 cell sensitive to radiation in the near ultra-violet region. The second curve 81 is that of a so-called S-1 cell (usually used in conjunction with a tungsten light source), sensitive to radiation in a region at approximately 8,000 angstroms corresponding to red visible light. It will be noted from Fig. 18 that the S-4 cell inherently has a sensitivity approximately ten times that of an S-1 cell. This sensitivity is obtained because of the fact that most photoelectric materials radiate easiest when excited with ultra-violet light.

In Fig. 19 the right hand curve 82 is that of a typical tungsten lamp. It will be noted that the main portion of lamp wattage is dissipated as radiation in the infra-red or heat region. The visible portion of the radiation comprises approximately 5% of the total lamp wattage. The left hand curve 83 is that of a fluorescent light using a sulfide fluorescent coating with maximum radiation in the near ultra-violet region at approximately 4,000 angstroms. It will be noticed that this radiation curve coincides closely with that of the S-4 cell in Fig. 18. Other spectral combinations of fluorescent coatings and photoelectric cathode surfacing or coating will give similar optical efficiency and value. The over all result of the use of the fluorescent light in combination with the S-4 cell is a great step-up in efficiency over that of the usual combination comprising a tungsten lamp and an S-1 cell.

Figure 20:
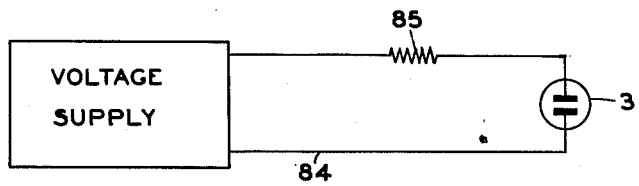
Figs. 20, 21 and 22 are circuit diagrams in the amplifier and power supply unit.

Fig. 20 shows a typical circuit 84 required with the use of a fluorescent light. Due to the fact that a fluorescent light has a negative resistance characteristic (tends to burn itself out when a fixed igniting voltage is applied), series resistance 85 must be used to limit the current flow to a safe value. In the operation with this circuit, as soon as the bulb lights, current is drawn, creating a voltage drop across the resistance which subtracts from the original voltage supplied.

Figure 21:
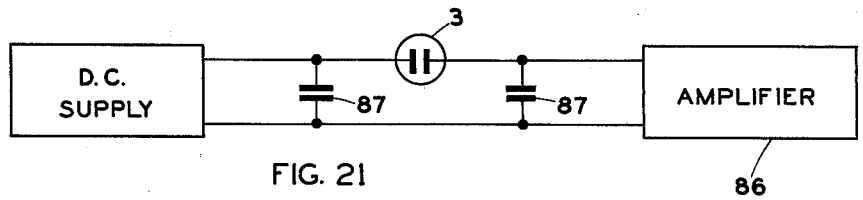

Fig. 21 is a diagram of a fluorescent light source of the type mentioned in which the amplifier 86 itself is used as a series resistance. Heat dissipated in the amplifier must be dissipated anyway in order to use the amplifier and therefore does not represent a loss in efficiency as far as the lighting circuit is concerned. The two condensers 87 shown are merely for the purposes of filtering the voltage.

Figure 22:
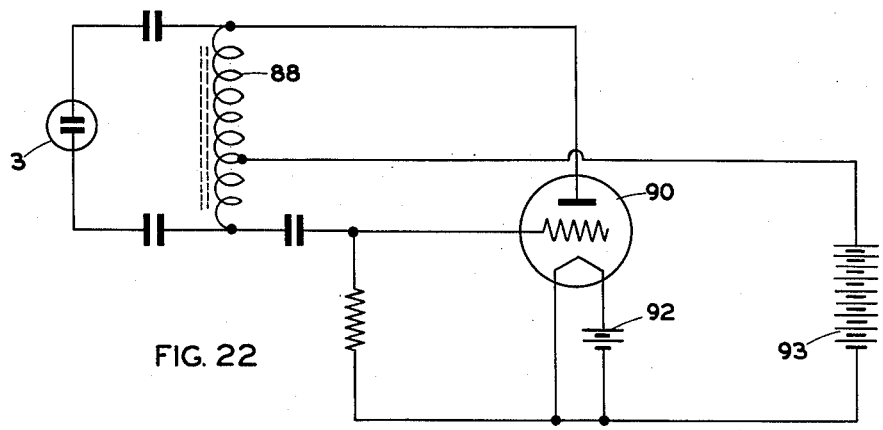

Fig. 22 shows another method of lighting the fluorescent bulb 3. In this diagrammatic showing, a supersonic oscillator is shown supplying energy to the bulb. The oscillator circuit is conventional, the oscillator supplying the bulb with a voltage which reverses itself at a supersonic rate (i. e., 20,000 cycles a second or higher). Automatic prevention of bulb burn-out is insured by reason of the fact that the oscillator is very unstable and its output voltage will lower appreciably at the time the bulb ignites. Supersonics are not heard by the human ear. Therefore, effectively, the output of the organ will be as if direct current were applied to the light source. The reason that the oscillator output voltage is lowered when the bulb is ignited is that the bulb, when so ignited, acts as a reactive load upon the tank circuit 88 energized by the radio tube 90 and the sources of electrical energy 92 and 93.

Figure 23:
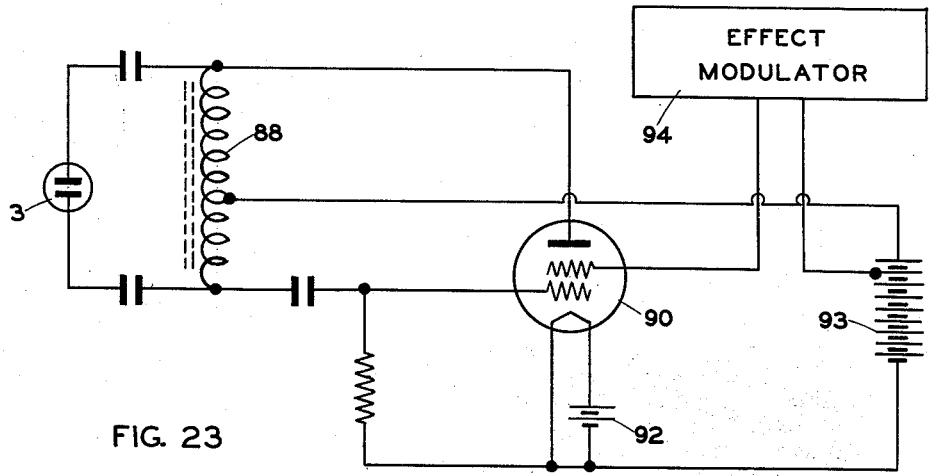
Figs. 23 and 24 are further illustrations of modified wiring diagrams which may be employed for obtaining different sound effects.

Fig. 23 shows a modification of the oscillator and fluorescent light 3 by introducing an effect modulator 94 in which a desired effect, such as "growl," amplitude tremolo, etc. is superimposed upon the light voltage. This, in turn, results in a corresponding fluctuation in the light and, therefore, sound. The fact that the fluorescent light will respond rapidly to variations in voltage allows audio modulation which is impractical, if not impossible, with a tungsten light source.

Figure 24:
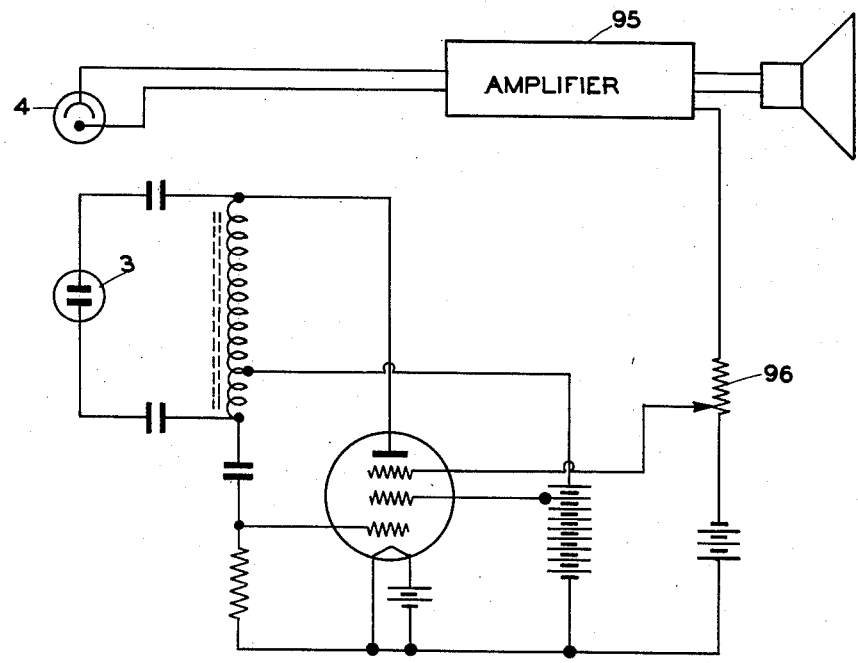

Fig. 24 is similar in essence to Fig. 23 with the exception that the modulating voltage is actually obtained from the output of the amplifier 95. Starting from the cell 4, the tone generated by the organ goes to the amplifier and is impressed across a regeneration control or variable resistor 96. This regeneration control is necessary to prevent the entire system from breaking into oscillation. It is seen that the output of the amplifier is actually fed back into the fluorescent light 3 which, in turn, will excite the photoelectric cell in the same manner. The result of this entire circuit is to increase the effective output a very great degree as the tone will be reamplified many times.

The over all volume may be regulated manually by a control on the audio amplifier. The sound tracks may be produced arbitrarily or through photographic transfer of a musical record. Extended frequency or octave ranges may be provided by adding on additional systems, or, for a low priced unit, by increasing the number of tracks on the disk.

The fact that the source of light is supersonically excited, the noise heretofore incidental to electronic tone generation under a gaseous source of light is considerably reduced. Furthermore, the starting of the light source is easier and there is less heat loss. High over all efficiency is provided by reason of the fact that the light from the fluorescent or glow discharge source radiates at, or approximately at, the sensitive point of the light sensitive cell. The need for lenses is eliminated, the shutter depth providing an inexpensive method of tracking or exposing the selected note beam to the cell clear and free from any superimposed extraneous beam. The playing disk is easily removed and replaced in a very simple and rapid manner. The disk speed is such that any irregularities in speed appear as a pleasing frequency vibrato. If desired, the record table may be rotated at a slower speed to enable the phonographic reproduction of the usual phonograph records. The light can be modulated to provide special effects in a practical manner. The glissando effect is accomplished simply and economically. The vibrato mechanism likewise is of economical construction which utilizes cyclic speed reduction.

The foregoing description has been given in detail and without thought of limitation since the inventive principles involved are capable of assuming other physical embodiments without departing from the spirit of the invention and the scope of the appended claims.

What is claimed is:

1. A musical instrument having a cabinet with a record playing chamber, a light source, a light sensitive cell, a light screen optically interposed therebetween and having a light aperture therein for passing a beam of light from the source to the cell, a rotatable spindle in the chamber for receiving a sound track record, an electric drive for the spindle, a record holder removably positioned over the end of the spindle for securing the record in an operative position thereon, a closure for the record playing chamber carrying the record holder and mounted for movement to and from an operative position, said closure carrying one of the first two named elements, and a switch in circuit with the drive and arranged for being closed by the closure upon operative placement of the holder.

2. A musical instrument having a source of light, a light sensitive cell, a light screen optically interposed therebetween and provided with a light slit, means movably supporting a series of sound tracks for movement over the light slit, light valves controlling the passage of the light beam from the source through the sound tracks and slit for impression upon the cell, each light valve having an effective thickness extending in the direction of the light beam sufficient for blocking the passage of adjacent angularly directed and non-selected light beams, and means for selectively operating the light valves.

3. A cabinet tone generator having a record playing chamber with a rotatable table therein for supporting a record having transparent sound tracks therein movable by the table over a light opening in the chamber, a closure for the chamber carrying a source of light for being positioned over the light opening at one side thereof when the closure is in its closed position, a light sensitive cell arranged at the opposite side of the light opening and connected in circuit with an amplifier for the production of sound by means of a normally inoperative loud speaker, light valves selectively operable from a keyboard for controlling the passage of the light beam through the light opening onto the cell, the keyboard comprising plural keys, and means operable by the keys for rendering the loud speaker operative.

4. An electronic tone generator having a record disk with concentric sound tracks of varying transparency, a source of light on one side of the record, a light sensitive cell on the opposite side of the record, a screen having a light opening interposed between the source and the cell for permitting passage of a light beam through the track onto the cell, amplifier means connected to the cell, light valves normally closing the light opening, and a keyboard having plural keys one for each valve and each connected to a respective valve by a cable taking over guide pulleys, the pulleys of adjacent key cables being relatively offset for compact association.

5. An electronic tone generator having a light source, a light sensitive cell, a light screen optically interposed therebetween and having a light slit for passing a beam of light from the source to the cell, a support rotatably holding a sound track record having multiple transparent sound tracks in the light beam, light valves normally closing the light slit and selectively operable to admit light as modified by corresponding ones of the sound tracks to the cell, means for driving the record support at a constant speed, a keyboard having keys individually connected to the light valves for selectively operating the same, and glissando means associated with the board and acting to vary the speed of rotation of the record support.

6. An electronic sound reproducing generator comprising a light source, a light sensitive cell, a light screen optically interposed between the two and having an aperture admitting passage of a light beam from the source to the cell, electronic means operatively connected to the cell for generating sound waves in accordance with the light beam impression upon the cell, means for supporting a record between the light source and the cell and having sound tracks passing the light beam therethrough with a modulating action in accordance with the sound characteristic of the track, a plurality of light valves, one for each track interposed between the record and the cell, and means for selectively operating the valves, the effective valving action of each valve being less than the width of its sound track.

7. An electronic sound generator comprising a light source, a light sensitive cell, a light screen optically interposed between the two foregoing elements and having an aperture admitting a light beam from the source to the cell, electronic means operatively connected to the cell for generating sound waves in accordance with the light beam impressions upon the cell, means for supporting a record between the light source and the cell, a light valve for each track, and means for regulating the valves selectively for passing or blocking the light beam to the cell, the effective length of the valves in the direction of the light beam being such that the passage of the light beam from an adjacent track entering an open valve at an angle with respect to its particular track light beam will be blocked by the adjacent light valve at the opposite side of the open valve.

8. An electronic sound generator comprising a light source, a light sensitive cell, a light screen optically interposed between the two foregoing elements and having an aperture admitting passage of a light beam from the source to the cell, electronic means operatively connected to the cell for generating sound waves in accordance with the light beam impressions upon the cell, means for supporting a sound track between the light source and the cell, a plurality of light valves, one for each track interposed between the record member and the cell, and means selectively opening the valves, each light valve being of channeled form with the channel transverse of the light beam, the valves having a nested relationship with marginal portions of one valve overlapping an adjacent valve and serving to delineate one margin of the adjacent valve aperture.

9. An electronic sound generator comprising a light source, a light sensitive cell, a light screen optically interposed between the two foregoing elements and having an aperture admitting a light beam from the source to the cell, electronic means operatively connected to the cell for generating sound waves in accordance with the light beam impressions upon the cell, a record member between the light source and the cell and having plural and adjacent sound tracks for passing the light beam therethrough with a modulating action in accordance with the sound characteristic of the tracks, plural light valves between the record member and the cell, and means for selectively regulating the valves, each valve being in the form of a shutter and having an offset guiding shank staggered relative to the guiding shanks of adjacent shutters, with guiding means having two rows of shank-receiving openings, the openings of one row being off-set with respect to the openings of the companion row.

10. An electronic sound generator comprising a light source, a light sensitive cell, a light screen optically interposed therebetween and having a light beam aperture passing light from the source to the cell, a spindle supporting a disk record with transparent sound tracks for modifying the action of the light beam upon the cell, light valves selectively operable to impress the track modified beam upon the cell, means operatively connected to the cell for generating sound in accordance with the modulated light beam, a drive for the spindle detachably connected thereto for rotating the same with a substantially uniform speed, a vibrato wheel eccentrically related to the spindle for accelerating and decelerating the spindle rotation in cycles at vibrato frequency, selectively operable to interpose the vibrato wheel in the spindle drive.

11. An electronic sound generator comprising a light source, a light sensitive cell, a light screen optically interposed between the two foregoing elements and having an aperture admitting passage of a light beam from the source to the cell, electronic means normally inoperative but connectible to the cell for generating sound in accordance with the light beam impressions upon the cell, means for supporting the sound track record between the light source and the cell for passing the light beam therethrough with a modulating action in accordance with the sound characteristic of the track, a plurality of light valves, one for each track, interposed between the record member and the cell, a keyboard having keys for actuating the valves selectively for passing or blocking the light beam to the cell, and means operable by and upon depression of the individual keys for operatively connecting the electronic means to the cell.

12. An electronic sound generator comprising a light source, a light sensitive cell, a light screen optically interposed between the two foregoing elements and having an aperture admitting a light beam from the source to the cell, electronic means operatively connected to the cell for generating sound waves in accordance with the light beam impressions upon the cell, a record member between the light source and the cell and having plural and adjacent sound tracks for passing the light beam therethrough with a modulating action in accordance with the sound characteristic of the tracks, plural light valves between the record member and the cell, and means for selectively regulating the valves, each valve being in the form of a shutter and having an offset guiding shank staggered relative to the guiding shanks of adjacent shutters, with guiding means having a plurality of rows of shank-receiving openings, the openings of each row being off-set with respect to the openings of the adjacent rows.

13. An electronic sound generator comprising a light source, a light sensitive cell, a light screen optically interposed therebetween and having a light beam aperture passing light from the source to the cell, a spindle supporting a disk record with transparent sound tracks for modifying the action of the light beam upon the cell, light valves selectively operable to impress the track modified beam upon the cell, means operatively connected to the cell for generating sound in accordance with the modulated light beam, a drive for the spindle connected thereto for rotating the same with a substantially uniform speed, a vibrato wheel eccentrically related to the spindle for accelerating and decelerating the spindle rotation in cycles at vibrato frequency.

References Cited in the file of this patent

UNITED STATES PATENTS

| Number | Name | Date |
|---|---|---|
| 1,856,665 | Stoller | May 3, 1932 |
| 1,967,238 | Goldwaite | July 24, 1934 |
| 1,977,875 | Donaldson | Oct. 23, 1934 |
| 1,980,292 | Potter | Nov. 13, 1934 |
| 1,991,522 | Ranger | Feb. 19, 1935 |
| 1,998,461 | Kucher | Apr. 23, 1935 |
| 2,251,052 | Hammond | July 29, 1941 |
| 2,408,589 | Wells | Oct. 1, 1946 |
| 2,415,591 | Henroteau | Feb. 11, 1947 |
| 2,452,743 | Fuschi | Nov. 2, 1948 |
| 2,458,532 | Schlesinger | Jan. 11, 1949 |
| 2,499,996 | Kelsey | Mar. 7, 1950 |
| 2,508,451 | Dicke | May 23, 1950 |
| 2,513,109 | Roth | June 27, 1950 |
| 2,540,727 | Hanert | Feb. 6, 1951 |
| 2,559,688 | Touvet | July 10, 1951 |